United States Patent [19]

Itamoto

[11] 4,406,166

[45] Sep. 27, 1983

[54] ANALOG FLUIDIC SPEED SENSOR

[75] Inventor: John T. Itamoto, Scottsdale, Ariz.

[73] Assignee: The Garrett Corporation, Los Angeles, Calif.

[21] Appl. No.: 325,168

[22] Filed: Nov. 27, 1981

[51] Int. Cl.³ .............................................. G01P 3/26
[52] U.S. Cl. ........................................ 73/502; 73/521
[58] Field of Search ................. 73/521, 502; 137/804, 137/825, 829

[56] References Cited

U.S. PATENT DOCUMENTS

| 2,333,044 | 10/1943 | Rosch . | |
|---|---|---|---|
| 3,311,987 | 4/1967 | Blazek . | |
| 3,363,453 | 1/1968 | Erickson . | |
| 3,528,298 | 9/1970 | Zoerb . | |
| 3,537,465 | 11/1970 | Moore | 137/829 X |
| 3,587,327 | 6/1971 | Desthulliers . | |
| 3,608,382 | 9/1971 | Leathers . | |
| 3,691,848 | 9/1972 | Egli et al. . | |
| 4,002,077 | 1/1977 | Taplin | 73/521 X |

FOREIGN PATENT DOCUMENTS 1266031 7/1966 Fed. Rep. of Germany .

OTHER PUBLICATIONS

Publication: J. W. Leathers, J. C. H. Davis, M.A., "A New Rotational Speed Sensor for Fluidics", Fourth Cranfield Fluidics Conference, Mar. 17–20, 1970, Paper T3, pp. T3-25-32.

Primary Examiner—James J. Gill
Attorney, Agent, or Firm—Terry L. Miller; Albert J. Miller

[57] ABSTRACT

An analog fluidic speed sensor including novel structure enhancing the signal-to-noise ratio of the sensor.

30 Claims, 4 Drawing Figures

ANALOG FLUIDIC SPEED SENSOR

The U.S. Government has rights in this invention pursuant to Contract No. DAAK 70-78-C-0093, awarded by the U.S. Army.

BACKGROUND OF THE INVENTION

This invention relates to an analog fluidic speed sensor and method. More particularly, this invention relates to a speed sensor providing a fluid pressure signal which is analogous to the velocity of a moving surface. The sensor provides a fluidic speed signal having a comparatively high signal-to-noise ratio despite the presence of a turbulent fluid boundary layer adjacent the moving surface.

A conventional fluidic speed sensor is known including a fluidic amplifier having a housing rotatably an input shaft. The fluidic amplifier includes a pair of oppositely disposed arcuate control passages respectively extending from a pair of control inlets to a power nozzle. The input shaft drivingly carries a disc defining a planar surface bounding the pair of control passages. Consequently, fluid flowing in the control passages is influenced by rotation of the input shaft and disc. According to the influence of the disc upon the fluid flowing in the control passages, a stream of fluid issuing from the power nozzle is deflected with respect to a splitter. The splitter separates a pair of output legs communicating with respective outlet passes. U.S. Pat. No. 3,528,298, granted Sept. 15, 1970 to E. G. Zoerb illustrates a conventional fluidic speed sensing apparatus of the above-described type.

A conventional speed sensor according to the Zoerb invention has a number of recognized deficiencies. Among these recognized deficiencies is the fact that the housing of the sensor must define a bore rotatably receiving the input shaft. Consequently, additional manufacturing steps and expense are necessary to provide the bore. Further manufacturing steps may be required to fit low-friction bearings into the bore for journaling the shaft. Yet another recognized deficiency of the Zoerb invention is that the input shaft and disc are integral parts of the speed sensor. In many situations where it is desired to measure the rotational speed of a shaft, it is difficult or impossible to drivingly connect the rotating shaft to the input shaft of the sensor. For example, it may be necessary to provide a gear on the rotating shaft to couple with a gear on the input shaft of the speed sensor. Another conventional expedient is to provide the input shaft of the sensor with a friction wheel engaging the outer surface of the rotating shaft. Both of these conventional expedients, and others, for coupling the speed sensor to a rotating shaft involve the provision of special gearing, shafting, or other driving apparatus coupling the sensor to the rotating shaft as well as the provision of mounting structure for holding the speed sensor adjacent the rotating shaft in proper relation to the driving apparatus. All of these provisions involve additional expense in the use of a speed sensor according to the Zoerb invention. Further, in those frequent situations where space for the sensor is limited, the necessary driving apparatus and mounting structure may prohibit altogether the use of a sensor according to the Zoerb invention.

Another conventional fluidic sensor includes a fluidic amplifier disposed adjacent to the disc of a gyroscope. The amplifier housing defines a part-spherical recess leading to a circular aperture. The circular aperture opens to the interaction region of the fluidic amplifier. The rim of the gyroscope disc is received in the part-spherical recess so that the outer circumferential surface of the disc is substantially tangent to the power jet of the amplifier. When the gyroscope disc rotates, a fluid boundary layer forming adjacent to the rim interacts with the power jet in the interaction region of the amplifier to effect a deflection of the power jet resulting in a fluidic output signal. Thus, the fluidic sensor produces an output signal analogous to the position of the gyroscope disc. U.S. Pat. No. 3,311,987, granted Apr. 4, 1967 to H. Blazek illustrates a fluidic sensor of the above-described conventional type.

A fluidic sensor according to the Blazek reference also has a number of recognized deficiencies. For example, the circular aperture opening to the interaction region of the amplifier is comparatively large in relation to the size of the interaction region. Because the power jet of the amplifier may be deflected anywhere along its course from the nozzle to the splitter, the comparatively large aperture may result in the jet being deflected a number of times as the jet traverses the aperture. As a result, the output signal of the sensor may not vary linearly with varying speed of the gyroscope disc. Further, when the fluid boundary layer is turbulent, the power jet is exposed to the turbulence over a comparatively long distance so that considerable noise may be induced into the output signal by the turbulence.

Furthermore, both the speed sensor of Zoerb and the sensor of Blazek suffer from yet another recognized deficiency. This deficiency stems from a natural tendency for fluid boundary layers to become turbulent above a certain speed, as indicated by Reynolds number. Below the certain speed, the fluid boundary layer is laminar and smoothly flowing. Consequently, the laminar boundary layer may interact with the power jet of a fluidic amplifier without inducing noise in the output signal of the amplifier. However, above a certain speed the boundary layer becomes turbulent and superimposes noise upon the fluidic output signal of the amplifier. This noise decreases the accuracy of the speed indication which is obtainable from the amplifier. The particular sensitivity to turbulence-induced noise of a sensor according to the Blazek invention has been pointed out supra.

SUMMARY OF THE INVENTION

In view of the recognized deficiencies of conventional fluidic speed sensors, it is an object for this invention to provide a speed sensor and method providing an output signal having a comparatively high signal-to-noise ratio despite the presence of a turbulent fluid boundary layer.

Another object is to provide a speed sensor and method in which the power jet of a fluidic amplifier is exposed to the fluid boundary layer over a comparatively short distance.

Yet another object for this invention is to provide a fluidic speed sensor which need not be physically coupled to a moving object in order to measure the speed of the object.

Still another object for this invention is to provide a fluidic speed sensor which need only be disposed adjacent to a surface of a moving object in order to measure the speed of the object.

In summary, this invention provides a fluidic speed sensor and method including a fluidic amplifier having a power jet disposable adjacent to the surface of a moving object. The housing of the amplifier includes a partition member interposing between the power jet and the moving surface. The partition member defines an aperture allowing limited admission of a fluid boundary layer to the interaction region of the amplifier. Spaced from the aperture in a direction opposite to the relative movement of the surface is a wall member. The wall member inhibits movement toward the aperture of a turbulent fluid boundary layer forming adjacent the moving surface.

The advantages of the invention are mainly that the output signal from the speed sensor has a comparatively high signal-to-noise ratio; and that the output signal has good linearity over a broad range of surface speeds. Further, the speed sensor need not be physically coupled to an object in order to measure the speed of the object. Additionally, the speed sensor is usable to measure rotational as well as linear speeds.

Further objects and advantages of the invention will appear in light of the following detailed description of a preferred embodiment of the invention.

DETAILED DESCRIPTION OF THE PREFERRED EMBODIMENT

Figure 1:
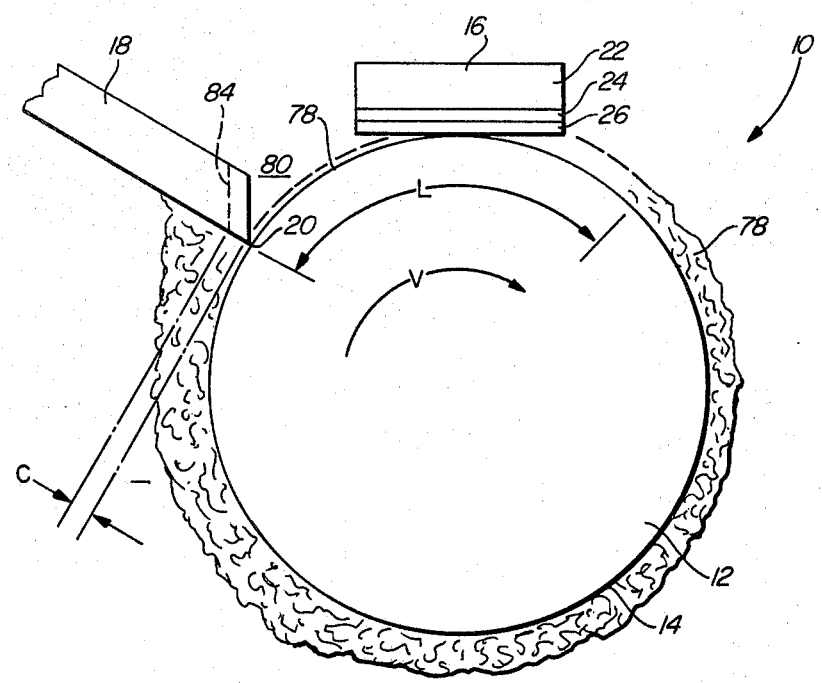
FIG. 1 is a schematic view of a speed sensor embodying the invention.

FIG. 1 illustrates a fluidic analog speed sensor 10 according to a preferred embodiment of the invention. The speed sensor 10 includes a rotatable member 12, the rotational speed of which is to be sensed. Rotatable member 12 defines a circumferentially extending outer surface 14 which also extends axially. Disposed closely adjacent to, but spaced from, the surface 12 is a fluidic sensor apparatus 16.

The member 13 is rotatable clockwise, as indicated by the arrow V. Spaced circumferentially counter-clockwise from the sensor apparatus 16 is an axially and radially extending wall member 18. That is, the wall member 18 is spaced from the sensor apparatus 16 in a direction opposite to the direction of relative movement of the surface 14. The wall member 18 defines a knife edge 20 which slidably engages the surface 14.

Figure 2:
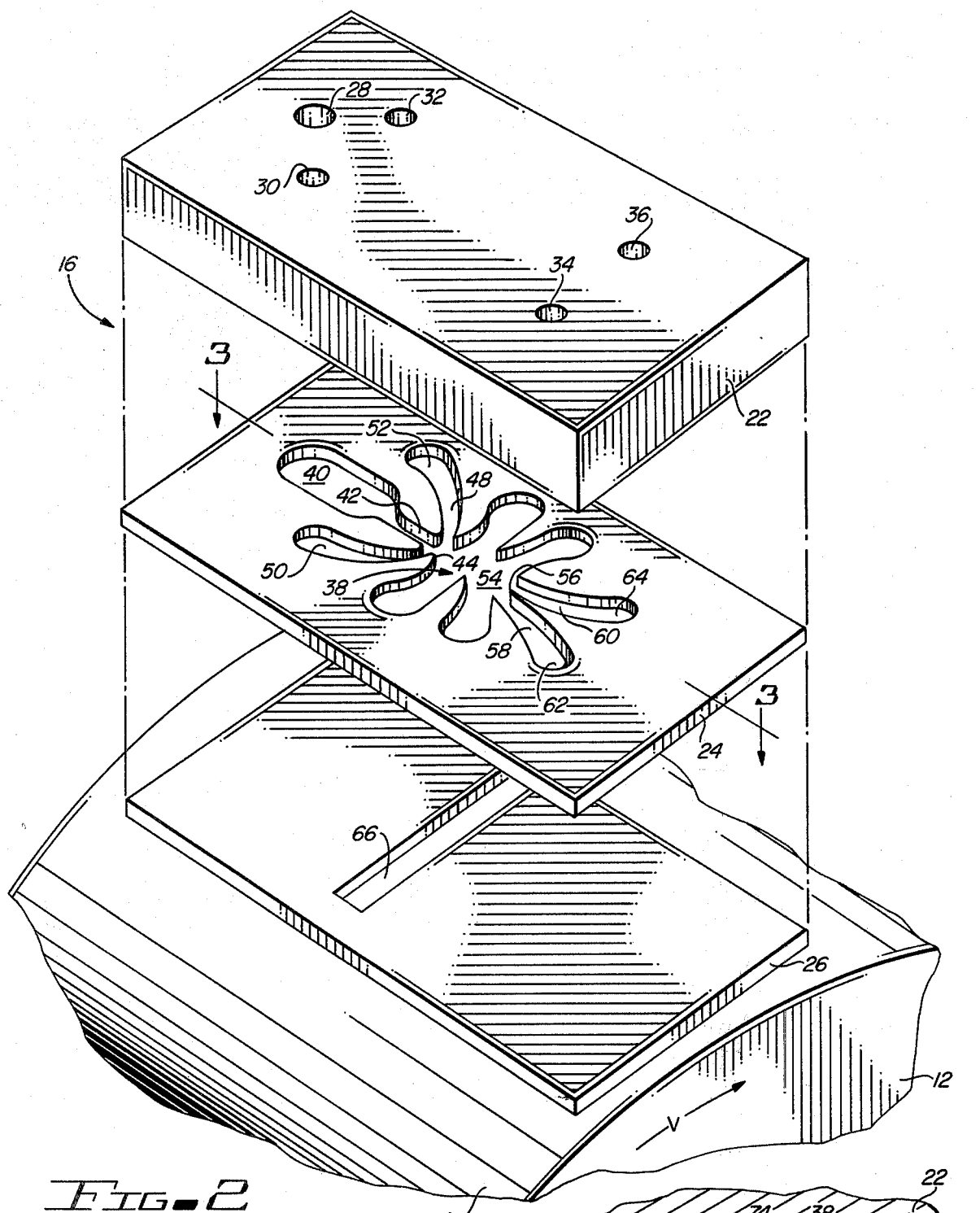
FIG. 2 is a pictorial view of a portion of the speed sensor exploded for clarity of illustration.

Viewing FIG. 2, the sensor apparatus 16 includes three laminae 22, 24, and 26. The radially outer lamina, or base member, 22 defines an inlet passage 28, a pair of control passages 30 and 32, and a pair of outlet passages 34 and 36, all extending radially therethrough. The intermediate lamina 24 defines an aperture, generally referenced with the numeral 38, extending therethrough. The aperture 38 includes a supply chamber 40, with which the inlet passage 28 communicates. A nozzle throat 42 leads from the supply chamber 40 to a nozzle opening 44. A pair of oppositely disposed control channels 46 and 48 intersect the nozzle throat 42 upstream of the nozzle opening 44. The control channels 46 and 48 lead to respective control chambers 50 and 52, with which the control passages 30 and 32 respectively communicate. The nozzle opening 44 opens into an interaction region or chamber 54. Disposed opposite the nozzle opening 44 is a knife edge splitter 56. The splitter 56 separates a pair of output legs 58 and 60. The output legs 58 and 60 lead to respective output chambers 62 and 64 which communicate respectively with the outlet passages 34 and 36. The radially inner lamina, or partition member, 26 defines an elongate aperture 66 extending substantially parallel to the direction of relative movement of the surface 14. Both the radially inner lamina 26 and the base member 22, define a substantially planar surface radially bounding the aperture 38 when the laminae are assembled.

Figure 3:
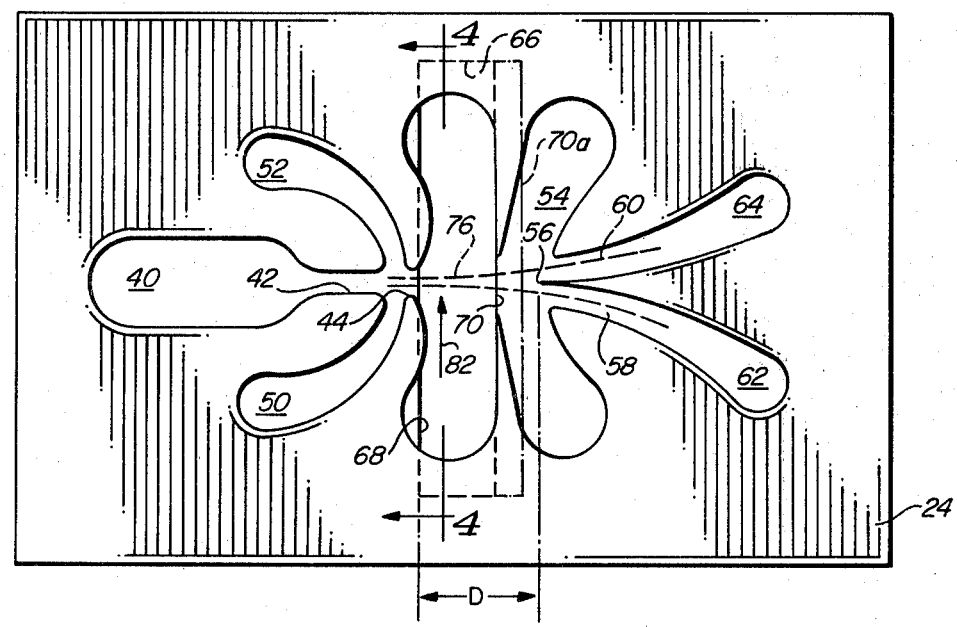
FIG. 3 is a plan view of a portion of the speed sensor considered in the plane defined by line 3—3 of FIG. 2.

Turning now to FIG. 3, it will be seen that the aperture 66 is congruent with the interaction region 54. The aperture 66 includes an upstream edge 68 adjacent to the nozzle opening 44 and a downstream edge 70. Knife edge splitter 56 confronts the nozzle opening 44 and is spaced therefrom a distance D. According to a preferred embodiment of the invention, the downstream edge 70 is spaced from the nozzle opening 44 a distance equal to about half, or less, of the distance D. That is to say, the distance of the downstream edge 70 from the nozzle opening 44 is preferably less than or equal to one-half of the distance from the nozzle opening 44 to the splitter 56. However, the downstream edge 70 may be spaced from the nozzle opening 44 as much as seventy-five percent of the distance D as is illustrated by dashed lines and the reference numeral 70a in FIG. 3.

Figure 4:
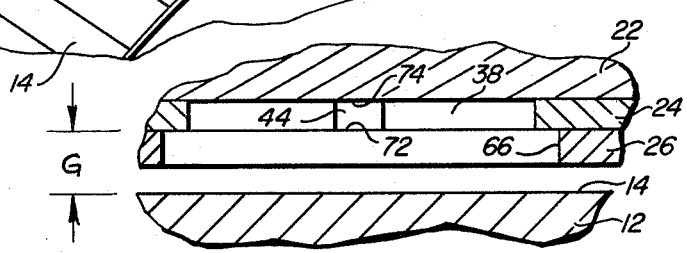
FIG. 4 is a fragmentary cross-sectional view taken along line 4—4 of FIG. 3.

FIG. 4 illustrates that the nozzle opening 44 is rectangular. The nozzle opening 44 has a radially inner boundary 72 defining a gap G with the surface 14 of the member 12. Spaced from the boundary 72 opposite the surface 14, the nozzle opening 44 has a boundary 74. The boundaries 74 and 72 are defined by the planar surfaces of the laminae 22 and 26, respectively. According to a preferred embodiment of the invention, the nozzle opening 44 is substantially square so that its width is equal to its height, viewing FIG. 4.

During operation of the speed sensor 10, a pressurized fluid is supplied to the inlet passage 28. The pressurized fluid communicates to the nozzle opening 44 via the supply chamber 40 and nozzle throat 42 so that a jet or stream of fluid (illustrated in dashed lines 76 viewing FIG. 3) issues from the nozzle opening 44. Because the splitter 56 confronts the nozzle opening 44 across the interaction region 54, the jet 76 impinges on the splitter 56 and divides to flow into the output legs 58 and 60. The kinetic energy of the jet 76 appears at the outlet passages 34 and 36 as fluid pressure according to the division of the jet 76 at the splitter 56. Thus, a fluid differential pressure signal is available at the outlet passage 34 and 36.

When the rotatable member 12 is rotating (as indicated by the arrow V, viewing FIG. 1) ambient fluid forms a boundary layer 78 adjacent to the moving surface 14. The boundary layer 78 may be either laminar or turbulent dependent upon the velocity of the surface 14 and the characteristics of the ambient fluid. Because the wall member 18 slidably engages the surface 14, the boundary layer 78 forms anew to the right of the knife edge 20 and grows in the direction of movement of surface 14 toward the sensor apparatus 16, viewing FIG. 1. That is, the wall member 18 defines an origin for the boundary layer 78. Thus, the circumferential space between the wall member 18 and the sensor apparatus 16 defines a growth region 80 for the boundary layer 78. The boundary layer 78 originates laminar and remains laminar for a determined distance L from the wall member 18 dependent upon the velocity of the surface 14. The distance L decreases with increasing velocity of the surface 14. Beyond the distance L the boundary layer becomes increasingly turbulent. Additionally, the wall member 18 inhibits the movement toward the sensor apparatus 16 of the boundary layer forming beyond the wall member (to the left of the wall member 18, viewing FIG. 1). According to a preferred embodiment of the invention, the aperture 66 of the apparatus 16 is located within the distance L from the wall member 18 over the entire speed range of the rotatable member 12 for which it is desired to obtain a speed signal from the sensor.

Viewing FIG. 3, the aperture 66 admits a portion of the boundary layer 78 to the interaction region 54 (indicated by arrow 82). Because the fluid stream 76 is disposed substantially perpendicular or normal to the relative direction of movement of surface 14, the boundary layer flow is normal to the jet 76. By momentum interaction, the boundary layer flow entering the aperture 66 deflects the jet 76. Consequently, the fluid pressure levels at the outlets 34 and 36 change so that the differential therebetween is an indication of the velocity of the surface 14, and, therefore, of the rotational speed of the member 12. Because the aperture 66 is relatively narrow transverse to the jet 76, portions of the boundary layer 78 having velocities which are not parallel to the direction of movement of surface 78, for example, because of turbulence, are substantially excluded from the interaction region 54. Further, because the fluid jet 76 is subject to the boundary layer 78 over a relatively short portion of its journey toward the splitter 56, the output signal from the sensor apparatus has good linearity with respect to the velocity of the surface 14.

FIG. 1 illustrates by a dashed line at 84 that the wall member need not actually touch the surface 14. The knife edge 20 may define a clearance C with the surface 14. Despite the clearance C, the wall member 14 substantially inhibits the movement toward the sensor apparatus 16 of the turbulent boundary layer 78 forming beyond the wall member.

A working embodiment of the invention utilized a rotatable member having a diameter of 1 inch with a fluid jet 0.02 inch square. The fluid jet was arranged to define a gap variable from 0.0092 inch to 0.019 inch with the surface of the rotatable member. A boundary layer inhibiting wall member was arranged one-quarter turn from the sensor apparatus and in full sliding contact with the rotatable member. The sensor displayed a sensitivity of 0.064 to 0.08 m.m. of mercury per 100 R.P.M. with a usable linear pressure range of from 0.34 m.m. to 0.40 m.m. over a speed range more than 5000 R.P.M. wide. The signal to noise ratio over this speed range was approximately 300 to 1. The optimum gap was determined to be 0.015 inch.

Those skilled in the art to which this invention pertains will recognize that a biasing signal may be applied to the control passages 30 and 32 in order to shift the linear range of the speed sensor to encompass the speed range which it is desired to measure. In other words, if it is desired to determine the speed of a member within the range from 10,000 to 12,000 R.P.M., the sensor may be biased by the application of a control fluid pressure to one of the control passages 30 or 32 so that the selected speed range falls within the linear-response speed range of the sensor. Further, a biasing signal may also be supplied to the control passages to provide compensation for variations in temperature. Additionally, it is apparent from the above that the surface 14 need not be circular. That is, the surface 14 may be rectilinear rather than curvilinear so that translational as well as rotational velocities may be sensed with the speed sensor of this invention. Still further, it is apparent that a second boundary layer inhibiting wall member may be provided on the oposite side of the sensor from the wall member 18. Thus, the sensor may be used to measure the speed of the rotatable member 12 in either direction of rotation.

It will be apparent in light of the above that this invention provides a speed sensor and method for measuring the velocity of a moving surface. While this invention has been described with reference to a preferred embodiment thereof, no limitation upon the invention should be implied because of such reference. The invention is intended to be limited only by the spirit and scope of the appended claims which alone define the invention.

I claim:

1. An analog fluidic speed sensor comprising a moving member the velocity of which is to be sensed, said moving member defining a surface, a fluidic speed sensor apparatus having a housing disposed proximate to said surface, said housing defining an interaction region entirely therewithin and an aperature opening outwardly on said housing toward said surface, said aperture communicating with said interaction region to allow entry therein of a laminar fluid boundary layer forming adjacent said surface, said speed sensor including wall means for inhibiting the movement toward said aperture of a turbulent fluid boundary layer forming adjacent to said surface.

2. The invention of claim 1 wherein said wall means is spaced from said aperture in a direction opposite to the direction of relative movement of said surface.

3. The invention of claim 1 wherein said wall means defines a knife edge proximate to said surface.

4. The invention of claim 1 wherein said wall means extends substantially perpendicularly to the direction of relative movement of said surface.

5. The invention of claim 1 wherein said wall means extends substantially normally to said surface.

6. The invention of claim 1 wherein said wall means slidably engages said surface.

7. The invention of claim 1 wherein said wall means defines a clearance with said surface.

8. An analog fluidic speed sensor comprising:
a member rotatable about an axis, said rotatable member defining an axially and circumferentially extending surface substantially concentric with said axis;
a housing disposed proximate to said surface of said rotatable member, said housing defining a chamber therewithin and an aperture opening outwardly of said chamber toward said surface, said housing defining an inlet receiving fluid from a source thereof, passage means for communicating fluid from said inlet to a nozzle, said nozzle opening to said chamber to direct a stream of fluid therethrough toward a knife edge confronting said nozzle, said knife edge separating a pair of outlet cavities opening to said chamber, said housing defining a pair of outlets respectively communicating with said pair of outlet cavities, said fluid stream being disposed substantially perpendicularly to the direction of relative movement of said surface of said rotatable member;

a wall member disposed adjacent to said surface, said wall member being spaced circumferentially from said aperture in a direction opposite to the direction of relative movement of said surface;

said aperture being elongate normal to said fluid stream and parallel to said direction of relative movement of said surface.

9. An analog fluidic speed sensor comprising a moving member the velocity of which is to be sensed, said moving member defining a surface, a fluidic speed sensor apparatus having a housing disposed proximate to said surface, said housing defining an interaction region therewithin and an aperture opening outwardly on said housing toward said surface, said aperture communicating with said interaction region, said speed sensor including wall means for inhibiting the movement toward said aperture of a fluid boundary layer forming adjacent to said surface, said fluidic speed sensor apparatus including a nozzle directing a stream of fluid across said interaction region toward a splitter spaced a determined distance from said nozzle, said aperture being elongate normal to said fluid stream, said aperture having an upstream edge proximate to said nozzle and a downstream edge spaced from said nozzle a selected distance, the ratio of said selected distance to said determined distance being less than 0.75.

10. The invention of claim 9 wherein said ratio is less than 0.50.

11. The invention of claim 9 wherein said fluid stream is disposed substantially normal to the direction of relative movement of said surface.

12. The invention of claim 9 wherein said fluid stream is substantially rectangular in cross section.

13. The invention of claim 12 wherein said fluid stream is square in cross section.

14. The invention of claim 9 wherein said fluid stream defines a gap with said surface.

15. The invention of claim 14 wherein said gap is in the range of from 0.0092 inch to 0.019 inch.

16. An analog fluidic speed sensor comprising a nozzle directing a stream of fluid through an interaction region toward a knife edge spaced a determined distance from said nozzle, a partition member bounding said interaction region, said partition member defining an aperture therethrough communicating with said interaction region, said aperture being elongate normal to said fluid stream, said aperture having an upstream edge proximate to said nozzle and a downstream edge spaced a selected distance from said nozzle, the ratio of said selected distance to said determined distance being less than 0.75.

17. The invention of claim 16 wherein said ratio is less than 0.50.

18. The invention of claim 16 wherein said fluid stream is substantially rectangular in cross section.

19. The invention of claim 18 wherein said fluid stream is square in cross section.

20. The invention of claim 18 wherein said partition member is disposed between said fluid stream and said surface.

21. The invention of claim 16 wherein said fluid stream is spaced away from a surface of a moving member to define a gap therewith.

22. The invention of claim 16 wherein said speed sensor is disposed adjacent to a surface of a moving member the velocity of which is to be sensed, said speed sensor further including a boundary layer inhibitor member spaced from said aperture in a direction opposite to the direction of relative movement of said surface, said members being disposed in a predetermined proximity to inhibit the movement toward said aperture of a fluid boundary layer forming adjacent to said surface.

23. An analog fluidic speed sensor comprising:
a member rotatable about an axis, said rotatable member defining an axially and circumferentially extending surface substantially concentric with said axis, viscous fluid adjacent said surface forming a fluid boundary layer upon rotation of said member;
a housing disposed proximate to said surface of said rotatable member, said housing defining a chamber therewithin and an aperture opening outwardly of said chamber toward said surface to admit said fluid boundary layer to said chamber, said housing defining an inlet receiving fluid from a source thereof, passage means for communicating fluid from said inlet to a nozzle, said nozzle opening to said chamber to direct a stream of fluid therethrough toward a knife edge confronting said nozzle, said knife edge separating a pair of outlet cavities opening to said chamber, said housing defining a pair of outlets, respectively communicating with said pair of outlet cavities, said fluid stream being disposed substantially perpendicularly to the direction of relative movement of said surface of said rotatable member;
a wall member disposed adjacent to said surface, said wall member being spaced circumferentially from said aperture in a direction opposite to the direction of relative movement of said surface to define a laminar flow boundary layer region extending toward and beyond said aperture, said wall member also preventing a turbulent fluid boundary layer forming adjacent said surface from reaching said aperture.

24. The invention of claim 23 wherein said wall member slidably engages said surface.

25. The invention of claim 23 wherein said aperture defines an upstream edge proximate to said nozzle and a downstream edge spaced a selected distance from said nozzle, said knife edge being spaced from said nozzle a determined distance, the ratio of said selected distance to said determined distance being less than 0.75.

26. The invention of claim 25 wherein said ratio is less than 0.50.

27. The method of improving the signal-to-noise ratio of an analog fluidic speed sensor comprising a fluidic amplifier having a housing, said housing defining an interaction region therewithin and an aperture leading from said interaction region to open outwardly on said housing, said aperture confronting a movable member the velocity of which is to be sensed, said method including the steps of inhibiting at at least one point movement toward said aperture of a turbulent fluid boundary layer forming adjacent to said movable member, and forming a laminar fluid boundary layer growth region extending from said one point toward said aperture.

28. The method of sensing the velocity of a moving surface having a turbulent fluid boundary layer moving therewith, said method including the steps of:
creating a discontinuity in said turbulent boundary layer;
providing a sensor which is responsive to the velocity of moving fluid, said sensor having an input section; and disposing said input section adjacent to said surface within said discontinuity.

29. The method of claim 28 wherein said discontinuity is created by forming a laminar-flow boundary layer moving with said surface.

30. The method of claim 29 wherein said laminar-flow boundary layer is formed by:
providing a wall member; and
disposing said wall member adjacent to said surface to inhibit said movement of said turbulent boundary layer.

* * * * *

UNITED STATES PATENT AND TRADEMARK OFFICE
CERTIFICATE OF CORRECTION

PATENT NO. : 4,406,166
DATED : September 27, 1983
INVENTOR(S) : JOHN T. ITAMOTO

It is certified that error appears in the above—identified patent and that said Letters Patent are hereby corrected as shown below:

Col. 1, line 18, following "rotatably", insert --receiving--;

Signed and Sealed this

Twenty-first Day of February 1984

[SEAL]

Attest:

GERALD J. MOSSINGHOFF

Attesting Officer

Commissioner of Patents and Trademarks